United States Patent [19]
Fujita et al.

[11] Patent Number: 5,324,784
[45] Date of Patent: Jun. 28, 1994

[54] PROCESS FOR PRODUCING PROPYLENE BLOCK COPOLYMER

[75] Inventors: Takashi Fujita; Naohiro Yamamoto, both of Yokkaichi, Japan

[73] Assignee: Mitsubishi Petrochemical Company Limited, Tokyo, Japan

[21] Appl. No.: 975,985

[22] Filed: Nov. 13, 1992

Related U.S. Application Data

[63] Continuation of Ser. No. 599,473, Oct. 18, 1990, abandoned.

[30] Foreign Application Priority Data

Oct. 19, 1989 [JP] Japan ................... 1-272651

[51] Int. Cl.$^5$ ............................. C08F 297/08
[52] U.S. Cl. .................... 525/247; 525/270; 525/323
[58] Field of Search ............ 525/247, 270, 323

[56] References Cited

U.S. PATENT DOCUMENTS

| | | | |
|---|---|---|---|
| 4,380,608 | 4/1983 | Hasuo et al. | 525/247 |
| 4,547,552 | 10/1985 | Toyota et al. | 525/247 |
| 4,703,026 | 10/1987 | Matsuura et al. | 502/119 |
| 4,739,015 | 4/1988 | Toyota et al. | 525/247 |
| 4,808,667 | 2/1989 | Goko et al. | 525/247 |

FOREIGN PATENT DOCUMENTS

| | | |
|---|---|---|
| 0145368 | 6/1985 | European Pat. Off. |
| 0261961 | 3/1988 | European Pat. Off. |
| 0357394 | 3/1990 | European Pat. Off. |
| 0368677 | 5/1990 | European Pat. Off. |
| 2184128 | 6/1987 | United Kingdom |

OTHER PUBLICATIONS

Chemical Abstracts, vol. 101, No. 8, 1984, p. 54, & JP-A-59041316, Mar. 7, 1984, "Propylene-ethylene block copolymer".

Chemical Abstracts, vol. 105, No. 9, 1986, p. 9, & JP-A-61047712, Mar. 8, 1986, "Polymerization catalysts in preparation of propylene polymers".

Primary Examiner—Romulo H. Delmendo
Attorney, Agent, or Firm—Oblon, Spivak, McClelland, Maier & Neustadt

[57] ABSTRACT

Propylene is copolymerized with ethylene in solvent-free polymerization in two steps where a resinous polymer is produced in the first step and a rubbery polymer is produced in the second step over a Ziegler catalyst whose solid catalyst component comprises a sub-component which is a solid catalyst component for a Ziegler catalyst comprising Ti, Mg and a halogen and which has, in accordance with the present invention, undergone mechanical milling. The solid catalyst components is specified. Less Sticky polymer powder is obtainable.

10 Claims, No Drawings

PROCESS FOR PRODUCING PROPYLENE BLOCK COPOLYMER

This application is a continuation of application Ser. No. 07/599,473, filed on Oct. 18, 1990, now abandoned.

BACKGROUND OF THE INVENTION

1. Field of the Art

This invention relates to a process for producing propylene block copolymers under the conditions where substantially no solvent is used in an improved yield, which polymers have high rigidity and high impact strength with good powder flowability.

2. Related Art

Crystalline polypropylene, while having excellent characteristics of rigidity and heat resistance, had on the other hand the problem of low impact strength, particularly low impact strength at a low temperature.

As the method for improving this point, there have been already known a method of forming a block copolymer by polymerizing stepwise propylene and ethylene or another olefin (Japanese Patent Publications Nos. 11230/1968, 16668/1969, 20621/1969, 24593/1974, 30264/1974, Japanese Laid-open Patent Publications Nos. 25781/1973, 115296/1975, 35789/1978 and 110072/1979).

However, when propylene and ethylene are polymerized in two stages or multiple stages, although impact resistance may be improved, there ensues on the other hand the problem that polymers of low crystallinity are formed in a large amount, because the product contains copolymer portions.

Also, for improvement of impact strength of a block copolymer, it has been generally practiced to increase an amount of a rubbery copolymer formed in the block copolymerization. However, formation of by-products may be increased, and the polymer particles tend to have increased tackiness with the increase of rubbery copolymers, whereby sticking between polymer particles or sticking of the polymer particles onto an inner wall of a reactor may occur, whereby it becomes frequently difficult to perform stable running of a polymer production reactor for a long term.

More particularly, poor fluidity of the polymer particles due to sticking of polymer particles will present a serious problem to operation of a process wherein no solvent is used, such as, e.g. gas-phase polymerization.

Accordingly, it has been desired to develop technology by which sticking of polymer particles is prevented when the content of a rubbery polymer is increased thereby to increase process stability.

SUMMARY OF THE INVENTION

The present inventors have studied intensively in order to solve the problems as mentioned above, and consequently found that the above problems can be solved by use of a specific catalyst whereby the present invention has been obtained.

More specifically, the present invention presents a process for producing propylene block copolymers which comprises practicing Polymerization step (1) and Polymerization step (2) in the substantial absence of a solvent and in the presence of a catalyst which comprises Catalyst component (A) and Catalyst component (B) thereby to produce a propylene block copolymer which contains a rubbery copolymer of propylene which is a fraction of the propylene block copolymer soluble in xylene at 20° C. in a quantity of 10 to 70% by weight of the block copolymer:

Catalyst component (A) being a contact product of Sub-components (i), (ii) and (iii);

Sub-component (i) being a solid catalyst component for a Ziegler catalyst comprising titanium, magnesium and a halogen atom as essential components, which has at least once undergone mechanical milling treatment, Sub-component (ii) being a silicon compound represented by a formula

$$R^1R^2{}_{3-n}Si(OR^3)_n$$

wherein $R^1$ indicates a group selected from the group consisting of a branched hydrocarbyl group of 3 to 20 carbon atoms and an alicyclic hydrocarbyl group of 5 to 20 carbon atoms, $R^2$ which may be the same as or different from $R^1$ indicates a hydrocarbyl group of 1 to 20 carbon atoms, $R^3$ which may be the same as or different from $R^1$ and/or $R^2$ indicates a hydrocarbyl group of 1 to 4 carbon atoms, and n is a number satisfying an equation $1 \leq n \leq 3$, and Sub-component (iii) being an organometal compound of a metal of the Group I to III of the Periodic Table, and Catalyst component (B) being an organoaluminum compound;

Polymerization step (1) being a process where propylene or a mixture of propylene with ethylene is polymerized in a single or a multiple step to form a propylene homopolymer or a propylene copolymer with ethylene of an ethylene content of no higher than 7% by weight in a quantity of 10 to 90% by weight of the total quantity of the block copolymer produced; and Polymerization step (2) being a process wherein a mixture of propylene with ethylene is polymerized in a single or multiple step in the presence of at least a part of the process product of the Polymerization step (1) to form a rubbery copolymer of propylene with ethylene of a proportion by weight of propylene to ethylene of 90/10 to 10/90 in a quantity of 90 to 10% by weight of the total quantity of the block copolymer produced.

Polymerization of propylene together with ethylene into a block copolymer with the catalyst according to the present invention in the substantial absence of a solvent results in a propylene block copolymer having high rigidity and high impact strength in a high yield (per catalyst used).

Also, according to the present invention, even when the weight of rubbery copolymer components may become much (e.g. 60% by weight or more), tackiness of polymer particles is little, and therefore the trouble in running operation which has been a problem in the prior art can be solved.

Still further, the catalyst activity during the step where a rubbery component of a block copolymer is produced, namely the polymerization step (2), is high. Most of known catalysts may suffer from reduced catalyst activity when they are used in the step for producing a rubbery component of a block copolymer, and the catalyst in accordance with the present invention which is free of this disadvantage is advantageous for use in commercial production of block copolymers.

It is also pointed out that use of a catalyst in accordance with the present invention will produce polymers endowed with improved powder or granulometric characteristics. Polymers produced by the present invention may have, for example, a bulk density of 0.45 g/cc or more.

DETAILED DESCRIPTION OF THE INVENTION

[I] Catalyst

The catalyst of the present invention comprises a combination of specific components (A) and (B). Here, the wording "comprises" does not mean that the components are limited only to those mentioned (namely, A and B), and does not exclude presence of other components compatible with or suited for the use of the components (A) and (B) in accordance with the present invention.

Component (A)

The component (A) of the catalyst of the present invention is a solid catalyst component for Ziegler catalysts obtained by contacting the components (i) to (III) shown below. Here, the wording "obtained by contacting" does not mean that the components are limited only to those mentioned, namely (i) to (III), and does not exclude co-presence of other components suited for the purpose. An example of the other components is an ethylenically unsaturated compound. The details will be set forth hereinbelow.

Sub-component (i)

The Sub-component (i) of the catalyst of the present invention is a solid component comprising titanium, magnesium and a halogen as the essential components which has at least once undergone mechanical milling treatment. Here, the wording "comprising as the essential components" indicates that it can also contain other elements suited for the purpose than the three components mentioned, that these elements can exist in any desired compound suited for the purpose respectively, and also that these elements can also exist in the form mutually bonded together. Solid components comprising titanium, magnesium and a halogen are known per se. For example, those as disclosed in Japanese Laid-open Patent Publications Nos. 45688/1978, 3894/1979, 31092/1979, 39483/1979 , 94591/1979, 118484/1979, 131589/1979, 75411/1980, 90510/1980, 90511/1980, 127405/1980, 147507/1980, 155003/1980, 18609/1981, 70005/1981, 72001/1981, 86905/1981, 90807/1981, 155206/1981, 3803/1982, 34103/1982, 92007/1982, 121003/1982, 5309/1983, 5310/1983, 5311/1983, 8706/1983, 27732/1983, 32604/1983, 32605/1983, 67703/1983, 117206/1983, 127708/1983, 183708/1983, 183709/1983, 149905/1984 and 149906/1984 may be employed.

As the magnesium compound which is the magnesium source to be used in the present invention, magnesium dihalides, dialkoxymagnesiums, alkoxymagnesium halides, magnesium oxyhalides, dialkylmagnesiums, magnesium oxide, magnesium hydroxide, carboxylates of magensium, etc. are exemplified. Among these magnesium compounds, magnesium dihalides, particularly $MgCl_2$, are preferred.

As the titanium compound which is the titanium source, compounds represented by the formula $Ti(OR^4)_{4-n}X_n$ (wherein $R^4$ is a hydrocarbyl group, preferably having about 1 to 10 carbon atoms, X represents a halogen atom and n is an integer of $0 \leq n \leq 4$) and polymers of a titanium tetraalkoxide. Specific examples may include:

titanium tetrahalides such as $TiCl_4$, $TiBr_4$ and the like;

alkoxytitanium halides such as
$Ti(OC_2H_5)Cl_3$,
$Ti(OC_2H_5)_2Cl_2$,
$Ti(OC_2H_5)_3Cl$,
$Ti(O-iC_3H_7)Cl_3$,
$Ti(O-nC_4H_9)Cl_3$,
$Ti(O-nC_4H_9)_2Cl_2$,
$Ti(OC_2H_5)Br_3$,
$Ti(OC_2H_5)(OC_4H_9)_2Cl$,
$Ti(O-nC_4H_9)_3Cl$,
$Ti(O-C_6H_5)Cl_3$,
$Ti(O-iC_4H_9)_2Cl_2$,
$Ti(OC_5H_{11})Cl_3$,
$Ti(OC_6H_{13})Cl_3$, and the like;
and titanium tetraalkoxides such as
$Ti(OC_2H_5)_4$,
$Ti(O-iC_3H_7)_4$,
$Ti(O-nC_3H_7)_4$,
$Ti(O-nC_4H_9)_4$,
$Ti(O-iC_4H_9)_4$,
$Ti(O-nC_5H_{11})_4$,
$Ti(O-nC_6H_{13})_4$,
$Ti(O-nC_7H_{15})_4$,
$Ti(O-nC_8H_{17})_4$,
$Ti[OCH_2CH(CH_3)_2]_4$,
$Ti[OH_2CH(C_2H_5)C_4H_9]_4$, and the like.
$TiCl_4$, $Ti(OEt)_4$, $Ti(OBu)_4$, and $Ti(OBu)Cl_3$ are preferable.

Polymers of a titanium tetraalkoxide may include those represented by the following formula:

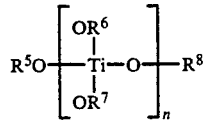

Here, $R^5$-$R^8$ represent the same or different hydrocarbyl groups, preferably aliphatic hydrocarbyl group having 1 to 10 carbon atoms or aromatic hydrocarbyl groups, particularly aliphatic hydrocarbyl groups having 2 to 6 carbon atoms. n represents a number of 2 or more, particularly a number up to 20. The value of n should be desirably selected so that the polytitanate itself or as a solution can be provided in a liquid state for the contact step with other components. A suitable n selected in view of ease of handling may be about 2 to 14, preferably 2 to 10. Specific examples of such polytitanates may include n-butylpolytitanate (n = 2 to 10), hexylpolytitanate (n = 2 to 10), n-octylpolytitanate (n = 2 to 10), and the like. Among them, n-butylpolytitanate is preferred.

It is also possible to use, as the titanium compound for the titanium source, a molecular compound obtained by reacting an electron donor as described below with a compound $TiX'_4$ (where X represents a halogen). Specific examples may include:
$TiCl_4 \cdot CH_3COC_2H_5$,
$TiCl_4 \cdot CH_3CO_2C_2H_5$,
$TiCl_4 \cdot C_6H_5NO_2$,
$TiCl_4 \cdot CH_3COCl$,
$TiCl_4 \cdot C_6H_5COCl$,
$TiCl_4 \cdot C_6H_5CO_2C_2H_5$,
$TiCl_4 \cdot ClCOC_2H_5$,
$TiCl_4 \cdot C_4H_4O$, and the like.

As the titanium compound can be used those represented by a formula: $Ti(OR^5)_{3-n}X_n$ wherein $R^5$ is a hydrocarbyl group preferably of 1 to 10 carbon atoms, X is a halogen atom and n is a number satisfying an equation: $0 \leq n \leq 3$, such as $TiCl_3$, $TiBr_3$, $Ti(OCH_3)Cl_2$, $Ti(C_2H_5)Cl_2$ and the like.

It is also possible to use, as the titanium compound for the titanium source, a titanocene compound, for example dicyclopentadienyldichloro titanium, dicyclopentadienyldimethyl titanium, bisindenyldichlorotitanium, and the like.

Among these titanium compounds, preferable are: $TiCl_4$, $Ti(OEt)_4$, $Ti(OBu)_4$, and $Ti(OBu)Cl_3$, $TiCl_4$ and $Ti(OBu)_4$ are more preferred.

As to the halogen source, it is a common practice to supply the halogen from the halide compounds of magnesium and/or titanium as described above, but it can be also supplied from non halogenating agents such as halogen compounds of aluminum, halogen compounds of silicon, halogen compounds of phosphorus, and the like.

The halogen contained in the catalyst components may be fluorine, chlorine, bromine, iodine or a mixture of these, particularly preferably chlorine.

The solid component to be used in the present invention can also comprise, in addition to the above essential components: a silicon compound such as $SiCl_4$, $CH_3SiCl_3$, and the like; a polymeric silicon compound which will be shown in detail hereinlater; an aluminum compound such as $Ai(OiC_3H_7)_3$, $AlCl_3$, $AlBr_3$, $Al(OC_2H_5)_3$, $Ai(OCH_3)_2Cl$; and a boron compound such as $B(OCH_3)_3$, $B(OC_2H_5)_3$, $B(OC_6H_5)_3$; $WCl_6$ and $MoCl_5$.

These optional compounds may remain in the solid component as the components of silicon, aluminum and boron.

Further, in preparing the solid sub-component (i), use can also be made of an electron donor as what is called "an inside donor".

Examples of the electron donor or the inside donor which can be used for preparation of the solid component may include oxygen-containing electron donors such as alcohols, phenols, ketones, aldehydes, carboxylic acids, esters of an organic acid or an inorganic acid, ethers, acid amides, acid anhydrides, and the like; and nitrogen-containing electron donors such as ammonia, amines, nitriles, isocyanates, and the like.

More specifically, there may be included: (a) alcohols having 1 to 18 carbon atoms, such as methanol, ethanol, propanol, pentanol, hexanol, octanol, dodecanol, octadecyl alcohol, benzyl alcohol, phenylethyl alcohol, cumyl alcohol, isopropylbenzyl alcohol and the like; (b) phenols having 6 to 25 carbon atoms which may or may not have an alkyl group, such as phenol, cresol, xylenol, ethylphenol, propylphenol, cumylphenol, nonylphenol, naphthol and the like; (c) ketones having 3 to 15 carbon atoms, such as acetone, methyl ethyl ketone, methyl isobutyl ketone, acetophenone, benzophenone and the like; (d) aldehydes having 2 to 15 carbon atoms, such as acetaldehyde, propionaldehyde, octylaldehyde, benzaldehyde, tolualdehyde, naphthaldehyde and the like; (e) organic acid esters having 2 to 20 carbon atoms, such as methyl formate, methyl acetate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl, benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, diethyl phthalate, dibutyl phthalate, diheptyl phthalate, γ-butyrolactone, α-valerolactone, coumarine, phthalide, ethylene carbonate, cellosolve ethyl acetate, cellosolve isobutyrate and cellosolve ethyl benzoate, etc.; (f) inorganic acid esters, such as silicates and borate such as ethyl silicate, butyl silicate, phenyltriethoxysilane, methyl borate, ethyl borate, phenyl borate, etc.; (g) acid halides having 2 to 15 carbon atoms, such as acetyl chloride, benzoyl chloride, toluyloic chloride, anisic chloride, phthaloyl chloride, phthaloyl isochloride and the like; (h) ethers having 2 to 20 carbon atoms, such as methyl ether, ethyl ether, isopropyl ether, butyl ether, amyl ether, tetrahydrofuran, anisole, diphenyl ether and the like; (i) acid amides, such as acetic amide, benzoic amide, toluyloic amide and the like; (j) amines, such as monomethylamine, monoethylamine, diethylamine, tributylamine, piperidine, tribenzylamine, aniline, pyridine, picoline, tetramethylethylenediamine and the like; and (k) nitriles, such as acetonitrile, benzonitrile, tolunitrile and the like. One or more of these electron donors can be used in preparing the solid catalyst component. Among them, preferred are organic acid esters, inorganic acid esters and organic acid halides, particularly preferably phthalic acid esters, phthalic acid halides and cellosolve acetate.

The amounts of the above respective components used may be at any desired level, so long as the advantages inherent in the present invention can be attained, but, generally speaking, the following ranges are preferred.

The amount of the titanium compound used may be within the range of $1 \times 10^{-4}$ to 1000, preferably 0.01 to 10, in terms of molar ratio relative to the amount of the magnesium compound used. When a compound as the halogen source is used, its amount used may be within the range of $1 \times 10^{-2}$ to 1000, preferably 0.1 to 100, in terms of a molar ratio relative to magnesium used, irrespectively of whether the titanium compound and/or the magnesium compound may contain a halogen or not.

The amount of the silicon, aluminum or boron compound used may be within the range of $1 \times 10^{-3}$ to 100, preferably 0.01 to 1, in terms of a molar ratio to the amount of the above magnesium compound used.

The amount of the electron donor compound used may be within the range of $1 \times 10^{-3}$ to 10, preferably 0.01 to 5, in terms of a molar ratio relative to the amount of the above magnesium compound used.

The sub-component (i) in accordance with the present invention is a contact product of the ingredient chemicals which has at least once undergone a mechanical milling treatment. The requirement "which has at least once undergone a mechanical milling treatment" herein means that a milling treatment is practiced at any desired step after or before the contact of the ingredient chemicals on the whole or a portion of the contact product or the ingredient chemicals.

Any mechanical milling treatment can be used as long as the advantages inherent in the present invention is thereby obtainable, but preferable may be the following. Milling methods are preferably by means of a rotating ball mill, a vibration mill, a jet mill, or a rod mill. Conventionally, the milling is conducted in the absence of an inert diluent, but it is possible upon necessity to conduct the milling in the presence of an aliphatic or aromatic hydrocarbon. Milling conditions may include a temperature of preferably −50° to 100° C. and a time of preferably 10 minutes to 100 hours.

The solid Sub-component (i) for preparing the component (A) may be prepared from the titanium source, the magnesium source and the halogen source, and further optionally other components such as an electron donor according to methods mentioned below.

(a) A method in which a magnesium halide optionally together with an electron donor is contacted with a titanium compound, and then milled.

(b) A method in which alumina or magnesia is treated with a phosphorus halide compound, and the product is contacted with a magnesium halide, an electron donor, and a titanium compound containing a halogen, and then milled.

(c) A method in which the solid component obtained by contacting a magnesium halide with a titanium tetraalkoxide and a polymeric silicon compound is contacted with a titanium halide compound and/or a silicon halide compound, and then milled.

As the polymeric silicon compound, those represented by the following formula are suitable:

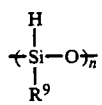

wherein $R^9$ is a hydrocarbyl group having about 1 to 10 carbon atoms, n is a degree of polymerization such that the viscosity of the polymeric silicon compound may be 1 to 100 centistokes.

Among them, methylhydrogenpolysiloxane, ethylhydrogenpolysiloxane, phenylhydrogenpolysiloxane, cyclohexylhydrogenpolysiloxane, 1,3,5,7-tetramethylcyclotetrasiloxane, and 1,3,5,7,9-pentamethylcyclopentasiloxane are preferred.

(d) A method in which a magnesium compound is dissolved in a titanium tetraalkoxide and an electron donor, and the solid component precipitated from the solution upon addition thereto of a halogenating agent or a titanium halide compound is milled and is then contacted with a titanium compound. Examples of halogenating agents include silicon halides, aluminium halides and halogen compounds of phosphorus.

(e) A method in which an organomagnesium compound such as Grignard reagent, etc. is reacted with a halogenating agent, a reducing agent, etc., and then the reaction product is milled and is optionally contacted with an electron donor and a titanium compound.

(f) A method in which an alkoxy magnesium compound which has been milled is contacted with a halogenating agent and/or a titanium compound in the presence or absence of an electron donor.

(g) A method in which a magnesium dihalide and a titanium tetraalkoxide and/or a polymer thereof are contacted, and subsequently contacted with a polymeric silicon compound.

Among these methods, methods (c) and (d) are preferable.

Contact of the three components can be effected in the presence of a dispersing medium. As the dispersing medium in that case, hydrocarbons, halogenated hydrocarbons, dialkylsiloxanes, etc. may be exemplified. Examples of hydrocarbons may include hexane, heptane, toluene, cyclohexane and the like; examples of halogenated hydrocarbons include n-butyl chloride, 1,2-dichloroethylene, carbon tetrachloride, chlorobenzene, etc.; and examples of dialkylpolysiloxane include dimethylpolysiloxane, methylphenylpolysiloxane and the like.

Sub-component (ii)

Sub-component (ii) for preparing the Component (A) is a silicon compound expressed by a formula

wherein $R^1$ is a group selected from the group consisting of a branched hydrocarbyl group and an alicyclic hydrocarbyl group, $R^2$ is a hydrocarbyl group which is the same as or different from $R^1$, $R^3$ is a hydrocarbyl group which is the same as or different from $R^1$ and/or $R^2$ and n is a number satisfying an equation $1 \leq n \leq 3$.

It is preferable that $R^1$ have a branch at the carbon atom adjacent to the silicon atom. The branch may preferably be an alkyl group and cycloalkyl group. More preferably, the carbon atom adjacent to the silicon atom, namely α-carbon atom, is a secondary or tertiary carbon atom. Most preferably, the carbon atom connected with the silicon atom is a tertiary carbon atom.

$R^1$ when it is a branched hydrocarbyl group may have 3 to 20, preferably 3 to 10, carbon atoms and $R^1$ when it is an alicyclic hydrocarbyl group may have 5 to 20, preferably 6 to 10, carbon atoms.

$R^2$ may have 1 to 20, preferably 1 to 10, most preferably 1 to 4, carbon atoms and may be in a branched or straight configuration.

$R^3$ may be an aliphatic hydrocarbyl group, and preferably is a linear aliphatic hydrocarbyl group of 1 to 4 carbon atoms.

Specific examples may include:

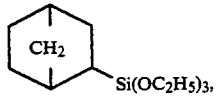

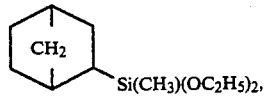

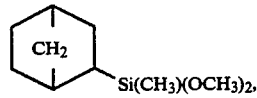

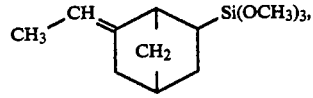

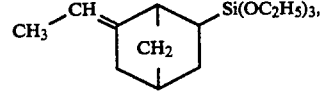

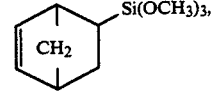

-continued

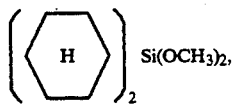

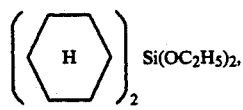

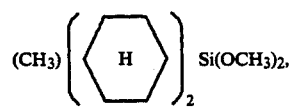

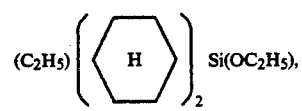

(CH$_3$)$_3$CSi(CH$_3$)(OCH$_3$)$_2$,
(CH$_3$)$_3$CSi(HC(CH$_3$)$_2$)(OCH$_3$)$_2$,
(CH$_3$)$_3$CSi(CH$_3$)(OC$_2$H$_3$)$_2$,
(C$_2$H$_5$)$_3$CSi(CH$_3$)(OCH$_3$)$_2$,
(CH$_3$)(C$_2$H$_5$)CHSi(CH$_3$)(OCH$_3$)$_2$,
((CH$_3$)$_2$CHCH$_2$)$_2$Si(OCH$_3$)$_2$,
(C$_2$H$_5$)(CH$_3$)$_2$CSi(CH$_3$)(OCH$_3$)$_2$,
(C$_2$H$_5$)(CH$_3$)$_2$CSi(CH$_3$)(OC$_2$H$_5$)$_2$,
(CH$_3$)$_3$CSi(OCH$_3$)$_3$,
(CH$_3$)$_3$CSi(OC$_2$H$_5$)$_3$,
(C$_2$H$_5$)$_3$CSi(OC$_2$H$_5$)$_3$,
(CH$_3$)(C$_2$H$_5$)CHSi(OCH$_3$)$_3$,
(C$_2$H$_5$)(CH$_3$)$_2$CSi(OCH$_3$)$_3$,
(C$_2$H$_5$)(CH$_3$)$_2$CSi(OC$_2$H$_5$)$_3$,
(iC$_3$H$_7$)$_2$Si(OCH$_3$)$_2$,
(iC$_3$H$_7$)$_2$Si(OC$_2$H$_5$)$_2$,
(iC$_3$H$_7$)(CH$_3$)Si(OCH$_3$)$_2$,

The preferable are those having R$^1$ which is a branched chain hydrocarbyl group of 3 to 20 carbon atoms whose α-carbon is secondary or tertiary, more preferably those having R$^1$ which is a branched hydrocarbyl group of 4 to 10 carbon atoms whose α-carbon is tertiary.

Sub-component (iii)

Sub-component (iii) for preparing a solid catalyst component (A) in accordance with the present invention is an organometal compound of a metal of the Group I to III of the Periodic Table.

The compounds are organometal compounds and thus have at least one organic radical-metal bonding. The organic radical may typically be a hydrocarbyl group of 1 to 20 carbon atoms, preferably 1 to 10 carbon atoms.

The remaining valence of the metal in question other than those satisfied by an organic radical, if any, can be satisfied by a hydrogen atom, a halogen atom, hydrocarbyloxy group of 1 to 20, preferably 1 to 10, carbon atoms, or the metal itself with an oxygen bridge such as

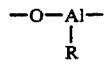

when the compounds are alkylalumoxanes where R is a lower alkyl.

Specific examples of such organometal compounds may include: (a) organolithium compounds, e.g. methyllithium, n-butyllithium, sec-butyllithium, tert-butyllithium and the like; (b) organomagnesium compounds, e.g. diethylmagnesium, ethylbutylmagnesium, dibutylmagnesium, dihexylmagnesium, hexylethylmagnesium, ethylmagnesium chloride, ethylmagnesium bromide, butylmagnesium chloride, tert-butylmagnesium bromide, and the like; (c) organozinc compounds, e.g. diethylzinc, dimethylzinc, dibutylzinc, and the like; (d) organoaluminum compounds, e.g. trimethylaluminum, triethylaluminum, triisobutylaluminum, tri-n-hexylaluminum, diethylaluminum chloride, diethylaluminum hydride, diethylaluminum ethoxide, ethylaluminum sesquichloride, ethylaluminum dichloride, methylalumoxane, and the like.

Among these, organoaluminum compounds including alkylalumoxanes are preferable. Further examples of organoaluminum compounds may be found in the examples of organoaluminum compounds as the Component (B) which will be given hereinbelow.

Preferred examples of alumoxanes include:
(i) cyclic alumoxanes of a formula

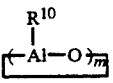

where R$^{10}$ is a hydrocarbyl group of 1 to 8 carbon atoms, preferably 1 to 4 carbon atoms, and m is a number of 2 to 100, preferably 5 to 40, and (ii) linear alumoxanes of a formula

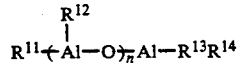

where R$^{11}$, R$^{12}$, R$^{13}$, and R$^{14}$ are each a hydrocarbyl group of 1 to 8 carbon atoms, preferably 1 to 4 carbon atoms, and n is a number of.2 to 100, preferably 5 to 40.

These alumoxanes are prepared by any suitable methods including, for example:

(a) a method wherein a trialkylaluminum is reacted with free water in a suitable organic solvent such as, e.g. toluene, benzene and ether;

(b) a method wherein a trialkylaluminum is reacted with water of crystallization of a hydrated salt such as, e.g. copper sulfate hydrate and aluminum sulfate; and (c) a method wherein a trialkylaluminum is reacted with water adsorbed in silica gel or the like.

The products of these methods may be mixtures of the cyclic and the linear alumoxanes, and no necessity is usually found for separating the cyclic structure from the linear structure for use in the present process.

Preparation of the Component (A)

The contacting conditions of the Sub-components (i)-(iii) and proportions can be as desired, so long as the advantages inherent in the present invention can be attained, but generally the following conditions are preferred.

The quantitative ratio of the Sub-components (i) to (iii) can be any desired one, so long as the advantages inherent in the present invention can be attained, but generally preferred to be within the following ranges.

The quantitative ratio of the Sub-component (i) to (ii) may be within the range of 0.01 to 1000, preferably 0.1 to 100, in terms of the atomic ratio (silicon/titanium) of the silicon of the Sub-component (ii) to the titanium component constituting the Sub-component (i).

The Sub-component (iii) is used in an amount within the range of 0.01 to 100, preferably 0.1 to 30, in terms of the atomic ratio of the metals {metal in the organometal compound (Sub-component (iii))/titanium(Sub-component (i))}.

The order and number of contacting of the Sub-components (i) to (iii) in preparing the component (A) of the present invention may be any desired one, so long as the advantages inherent in the present invention are attained.

Specific orders of such contact may include those as shown below, where the symbol "+" indicates a contact between the components flanking the symbol, and a washing or rinsing processing can be interposed between the contacts, (a) {Sub-component (i)+Sub-component (ii)}+Sub-component (iii);

(b) {Sub-component (i)+Sub-component (iii)}+Sub-component (ii);

(c) Sub-component (i)+{(Sub-component (ii)+Sub-component (iii)}+{Sub-component (ii)+Sub-component (iii)};

(d) {(Sub-component (ii)+Sub-component (iii)}+Sub-component (i); and (e) Sub-component (i)+Sub-component (ii)+Sub-component (iii).

The contact temperature may be about −50° to 200° C., preferably 0° to 100° C. As the contacting method, there may be employed a mechanical method wherein a rotating ball mill, a vibrating ball mill, a jet mill, a medium stirring pulverizer or the like is used and the method in which contact is effected with stirring under the presence of an inert diluent. As the inert diluent to be used, aliphatic or aromatic hydrocarbons and halohydrocarbons, polysiloxane, etc. may be exemplified. The contact can be effected in the presence of any optional compounds, provided that the advantages inherent in the present invention are not impaired, such as methylhydrogen polysiloxane, ethyl borate, aluminum triisopropoxide, aluminum trichloride, silicon tetrachloride, a titanium compound of a formula: Ti-(OR$^{15}$)$_{4-n}$X$_n$ wherein n is a number of an equation $0 \leq n \leq 4$, R$^{15}$ is a hydrocarbyl group and X indicates a halogen atom, a tri-valent titanium compound, wolfram hexachloride, molybdenum pentachloride and the like.

Another example of the optional component for use in preparing the Component (A) is an ethylenically unsaturated compounds such as an olefin and a diene. Examples of the ethylenically unsaturated compound include ethylene, propylene, 1-butene, 2-butene, isobutylene, 1-pentene, 2-pentene, 2-methyl-1-butene, 3-methyl-1-butene, 1-hexene, 2-hexene, 3-hexene, 2-methyl-1-pentene, 3-methyl-1-pentene, 4-methyl-1-pentene, 2-methyl-2-pentene, 3-methyl-2-pentene, 4-methyl-2-pentene, 2-ethyl-1-butene, 2,3-dimethyl-1-butene, 3,3-dimethyl-1-butene, 2,3-dimethyl-2-butene, 1-heptene, 1-octene, 2-octene, 3-octene, 4-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, styrene, α-methylstyrene, divinylbenzene, 1,2-butadiene, isoprene, hexadiene, 1,4-hexadiene, 1,5-hexadiene, 1,3-pentadiene, 1,4-pentadiene, 2,3-pentadiene, 2,6-octadiene, cis 2, trans 4-hexadiene, trans 2, trans 4-hexadiene, 1,2-heptadiene, 1,4-heptadiene, 1,5-heptadiene, 1,6-heptadiene, 2,4-heptadiene, dicyclopentadiene, 1,3-cyclohexadiene, 1,4-cyclohexadiene, cyclopentadiene, 1,3-cycloheptadiene, 1,3-butadiene, 4-methyl-1,4-hexadiene, 5-methyl-1,4-hexadiene, 1,9-decadiene, 1,13-tetradecadiene, 2-norbornene, and 2,5-norbornadiene.

These compounds usually polymerize upon contact with the Component (A) with or without an organoaluminum compound combined therewith, and, accordingly, Compound (A) so prepared can be called Compound (A) which has undergone what is called preliminary polymerization. The contact of Component (A) with ethylenically unsaturated compounds is usually conducted at a temperature lower than the temperature at which propylene and ethylene are polymerized to produce propylene block copolymers in accordance with the present invention.

The quantity of the α-olefin polymerized may be 0.001 to 100 grams, preferably 0.1 to 10 grams, per 1 gram of the contact product of the sub-components (i) to (iii).

Component (B)

The component (B) is an organoaluminum compound. Specific examples may include those represented by R$^{16}$$_{3-n}$AlX$_n$ or R$^{17}$$_{3-m}$Al(OR$^{18}$)$_m$ (wherein R$^{16}$ and R$^{17}$, which may be the same or different, are each hydrocarbyl groups having about 1 to 20 carbon atoms or hydrogen atom, R$^{18}$ is a hydrocarbyl group, X is a halogen atom, n and m are respectively numbers of $0 \leq n \leq 3$, $0 \leq m \leq 3$).

Specifically, there may be included (a) trialkylaluminums such as trimethylaluminum, triethylaluminum, triisobutylaluminum, trihexylaluminum, trioctylaluminum, tridecylaluminum, and the like; (b) alkylaluminum halides such as diethylaluminum monochloride, diisobutylaluminum monochloride, ethylaluminum sesquichloride, ethylaluminum dichloride, and the like; (c) dialkylaluminum hydrides such as diethylaluminum hydride, diisobutylaluminum hydride and the like; (d) aluminum alkoxides such as diethylaluminum ethoxide, diethylaluminum phenoxide, and the like.

The organoaluminum compounds of (a) to (c) can be used in combination with alkylaluminum alkoxides, such as, for example, alkylaluminum alkoxides represented by the formula: R$^{19}$$_{3-a}$Al(OR$^{20}$)$_a$ (wherein $1 \leq a \leq 3$, R$^{19}$ and R$^{20}$, which may be either the same or different, are each hydrocarbyl groups having about 1 to 20 carbon atoms). For example, there may be included combinations of triethylaluminum with diethylaluminum ethoxide; of diethylaluminum monochloride with diethylaluminum ethoxide; of ethylaluminum dichloride with ethylaluminum diethoxide; and of triethylaluminum, diethylaluminum ethoxide and diethylaluminum chloride.

The amount of the component (B) used may be 0.1 to 1000, preferably 1 to 100, in terms of weight ratio of the component (B)/component (A).

Component (C) (optional)

The catalyst in accordance with the present invention comprises Component (A) and Component (B), and can contain another component which is compatible with the present invention as described hereinabove.

One of such a compatible component is a boron alkoxide having a bond of the formula B—OR$^{21}$, R$^{21}$ being an aliphatic or aromatic hydrocarbyl group having about 1 to 20, preferably about 1 to 8 carbon atoms. The balance of the valence of boron is preferably satisfied with the same or different $OR^{21}$ group, an alkyl group (preferably about $C_1$ to $C_{10}$), a halogen atom (preferably chlorine), or a cyclic hydrocarbyl group of about $C_6$ to $C_{10}$.

Specific examples of such boron compounds may include:
$B(OCH_3)_3$,
$B(OC_2H_5)_3$,
$B(OC_3H_7)_3$,
$B(OiC_3H_7)_3$,
$B(O-nC_4H_9)_3$,
$B(OC_6H_{13})_3$,
$B(OC_6H_5)_3$,
$B(OC_6H_4(CH_3))_3$,
$B(OC_2H_5)_2Cl$,
$B(OCH_3)_2Cl$,
$(C_2H_5)B(OC_2H_5)_2$,
$B(C_6H_5)(OCH_3)_2$,
$B(OC_4H_9)Cl_2$, and the like.

Among them, preferable are $B(OCH_3)_3$, $B(OC_2H_5)_3$ and $B(O-nC_4H_9)_3$.

The amount of the component (C) used may be within the range of 0.1 to 40, preferably 1 to 20, in terms of molar ratio relative to the titanium constituting the component (A). The optional component (C) can be used in such a way that it is added to polymerization.

[II] Polymerization process

The polymerization process conducted in the presence of the above-described catalyst components, Components (A), (B) and (C), Component (C) being optional, is conducted in multi-steps, and at least two steps, i.e. step (1) and step (2), two steps being preferred, and the order of step (1) and then step (2) being preferred.

Both the steps (1) and (2) are conducted in the substantial absence of a solvent, and in such a way, as is found in the conventional block copolymer production, that the later step (2) is conducted in the presence of at least a part of the process product of the former step (1).

Making Up of a Catalyst

The catalysts in accordance with the present invention may be made up by contacting Components (A) and (B) or (A), (B) and (C) each other at once, or stepwisely or portion-wisely, within or outside a polymerization vessel.

Components (A) and (B), and (C) when used, can be supplemented during polymerization and/or to one or each of the steps (i) and (ii). This is especially true to Component (B), and it can be supplemented at the step (ii).

Step (1) polymerization

The step (1) polymerization is a process wherein propylene as it is or in admixture with a small quantity of ethylene is contacted with a catalyst comprising Components (A) and (B) or Components (A), (B) and (C) at once, or step-wisely or portion-wisely, thereby to produce a homopolymer of propylene or a copolymer of propylene with ethylene of an ethylene content of no higher than 7% by weight, preferably no higher than 3.0% by weight, more preferably no higher than 0.5% by weight, in a quantity of 10 to 90% by weight, preferably 20 to 80% by weight, of the total polymer produced.

The polymers produced in the step (1) which contain ethylene in excess of 7% by weight will result in the total copolymers produced such that the bulk density is undesirably low and quantity of low crystalline by-product polymers is considerably high. When the polymers produced in the step (1) comprise less than 10% by weight of the total polymer produced, quantity of the low crystalline by-product polymers in the final copolymer is increased, too. When the polymers produced in the step (1) comprise more than 90% by weight of the total polymer produced, on the other hand, no advantage inherent in the present invention such as improvement in impact strength of the polymer produced inherent in block copolymers of this nature nor improvement in the spiral flow of the polymers produced which is inherent in the present invention will be attainable.

The step (1) of polymerization in accordance with the present invention may be conducted at a temperature of e.g. 30° to 95° C., preferably 50° to 85° C., and under a pressure of 1 to 50 $kg/cm^2 \cdot G$. It is preferable to conduct the step (1) in the presence of hydrogen gas or another molecular weight controlling agent so as to obtain the final polymer of a higher melt flow rate.

Step (2) Polymerization

The later step polymerization is conducted, according to conventional production of propylene block copolymers, in the presence of at least portion of or preferably all of the product produced in the former step polymerization.

More particularly and typically, a mixture of propylene with ethylene is further introduced in a single batch or portion-wisely into the polymerization vessel in which the step (1) polymerization has taken place or into another polymerization vessel to which the process product of the step (1) has been transferred, thereby to produce propylene/ethylene copolymers of the propylene/ethylene ratio by weight of 90/10 to 10/90, preferably 70/30 to 3.0/70. The copolymers produced in the step (2) of polymerization comprise the rest of the total polymer produced, namely 90 to 10% by weight, preferably 80 to 20% by weight, of the total polymer produced.

The step (2) polymerization is designed for producing elastomeric polymers, and another α-olefin such as 1-butene, 1-pentene or 1-hexene can optionally and additionally be copolymerized.

The step (2) polymerization may be conducted at a temperature of e.g. 30° to 90° C., preferably 50° to 80° C., and under a pressure of e.g. 1 to 50 $kg/cm^2 \cdot G$.

It is preferable to operate the former step (1) polymerization and the later step polymerization so that the gaseous components present at the end of the former step polymerization such as propylene gas or propylene/ethylene gas and hydrogen if used are purged from the polymerization before the later step polymerization is initiated.

The later step polymerization is conducted in the presence of at least a portion of the product produced in the former step polymerization, which is still catalytically active, and the catalyst used for the former step polymerization is used for continuing polymerization in the later step polymerization. It is, however, possible to supplement Component (A), (B) and/or (C) upon necessity.

The later step polymerization (2) may be conducted in the absence of hydrogen or another molecular weight controlling agent, but it is possible to use such.

Polymerization Mode

The process for producing the copolymer according to the present invention can be practiced according to any of the batch-wise mode, the continuous mode and the semibatch-wise mode. These polymerization modes may be practiced by a method in which polymerization is carried out with the monomer used itself as a polymerization medium or dispersant, a method in which polymerization is carried out in gaseous monomers without use of any polymerization medium added, or a method in which polymerization is carried out in combination of these.

A preferable polymerization method is such that polymerization is carried out in the atmosphere of gaseous monomers wherein a fluidized bed of the particles of the polymer produced is utilized or the particles of the polymer produced are agitated in the polymerization vessel.

[III] Propylene Block Copolymers Produced

The propylene block copolymers produced in the substantial absence of a solvent in accordance with the present invention comprise a rubbery polymer of propylene in a quantity of 10 to 70% by weight, preferably 20 to 70% by weight, more preferably 35 to 60% by weight. The "rubbery polymer of propylene" means a fraction of polymer (of the block copolymer) which is soluble in xylene at 20° C.

The present invention is concerned with production of propylene block copolymers. It should be understood that the wording "block copolymer" does not necessarily mean (a) a block copolymer of an ideal state such that the block formed in the step (1) and the block formed in the step (2) are in the same and common molecule chain, but include as is conventional in the art those which are (b) mixtures of the polymers formed in each step and those which are mixtures in any proportion of the ideal block copolymer (a) and the mixture of the polymers (b).

[IV] Experimental Examples

Example-1

Preparation of Component (A)

Into a flask thoroughly purged with nitrogen was introduced 300 ml of dehydrated and deoxygenated n-heptane, and subsequently 0.2 mol of $MgCl_2$ and 0.4 mol of $Ti(O-nC_4H_9)_4$ and the reaction was carried out at 95° C. for 2 hours. After completion of the reaction, the temperature was lowered to 40° C., followed by addition of 30 ml of methylhydrogenpolysiloxane (of 20 centistokes) and the reaction was carried out for 3 hours. The solid product formed was washed with n-heptane.

Subsequently into a flask thoroughly purged with nitrogen was introduced 100 ml of n-heptane purified similarly as described above, and the solid product synthesized above was introduced in an amount of 0.1 mol as calculated on Mg atom. Then, a mixture of 25 ml of n-heptane with 0.15 mol of $SiCl_4$ was introduced into the flask at 30° C. over 30 minutes, and the reaction was carried out at 90° C. for 3 hours. After completion of the reaction, the product was washed with n-heptane.

A mixture of 25 ml of n-heptane with 0.09 mole of phthaloyl chloride was added to the flask at 90° C. for 30 minutes, and the reaction was carried out at 95° C. for 1 hour. After the reaction, the solid product was washed with n-heptane, and 15 ml of $SiCl_4$ and 80 ml of n-heptane were then added thereto and the reaction was carried out at 90° C. for 4 hours. After the reaction, the solid product was washed with n-heptane. The solid thus obtained was found to contain 1.68% by weight of titanium. The solid product thus obtained was milled for 8 hours in a stainless steel pot of a capacity of 370 ml containing nylon balls of 15 mm∅ in an apparent volume of 35 volume % to which the solid product was introduced under a nitrogen atmosphere. The milled product was taken out of the pot in a dry box to use as the sub-component (i).

Into a flask amply purged with nitrogen was introduced 50 ml of amply purified n-heptane, and then 5 g of the solid product obtained above, sub-component (i), was introduced. Next, 1.2 ml of $(CH_3)_3CSi(CH_3)(OCH_3)_2$ as the sub-component (ii), and 3.0 g of triethylaluminum as the sub-component (iii) were respectively introduced and contacted at 30° C. for 2 hours. After completion of the contact, the product was amply washed with n-heptane to provide Component (A).

Copolymerization of Propylene

According to the process disclosed in Japanese Patent Publication No. 33721/1986, copolymerization of propylene was carried out wherein a horizontal biaxial gas phase polymerization vessel of 13-liter volume was used.

After replacement of the polymerization vessel inside with amply purified nitrogen, 400 g of an amply dehydrated and deoxygenated polymer carrier was added. Subsequently, 500 mg of triethylaluminum as the component (B) and 80 mg of the above synthesized component (A) were introduced. In the polymerization step (1), after introduction of 1000 ml of hydrogen, at a temperature controlled to 75° C., propylene was introduced at a constant rate of 1.3 g/min. The stirring rotation of the polymerization vessel was 350 r.p.m. The polymerization temperature was maintained at 75° C. and, after 3 hours and 10 minutes, introduction of propylene was stopped. Polymerization was continued at 75° C., and when the polymerization pressure became 1 $Kg/cm^2G$, a small amount of the polymer sample was collected.

Then, 500 ml of $H_2$ was added to initiate the second stage polymerization. The second stage polymerization the polymerization step (2), was carried out so that 0.59 g/min. of propylene and 0.40 g/min. of ethylene were respectively introduced at constant rates at 70° C. for 2 hours and 15 minutes. Introduction of propylene and ethylene was stopped, and polymerization under the residual pressure was carried out until the polymerization pressure became 1 $Kg/cm^2G$. After completion of polymerization, the polymer was taken out after purging to give 381 g of a polymer. The polymer formed had an MFR of 7.1 g/10 min., a polymer bulk density (B.D.) of 0.42 g/cc, and a polymer falling speed of 5.4 sec. The weight of the rubbery copolymer was 34.5% by weight. No polymer adhesion to the polymerization vessel was found, and the intermediate polymer sampled had an MFR of 17.1 g/10 min.

The "polymer falling speed" means a time required for dropping 50 g of a polymer powder from an opening of 2.5 $cm^2$.

Example-2

Preparation of Component (A)

As in Example-1, MgCl$_2$, Ti(O-nC$_4$H$_9$)$_4$ and methylhydrogenpolysiloxane were caused to react to form a solid product, which was washed with n-heptane.

Into a flask purged with nitrogen gas were added 50 ml of n-heptane similarly purified and 0.1 mole of the above solid product. A mixture of 50 ml of n-heptane with 39 ml of SiCl$_4$ was added to the flask at 30° C. over 30 minutes, and caused to react at 90° C. for 1 hour. After the reaction, the solid product obtained was washed with n-heptane. The milling was conducted as in Example-1 except for the milling time which was changed to 4 hours.

To 5 g of the solid product introduced in a flask purged with N$_2$ were then added 50 ml of n-heptane and 2.4 ml of (CH$_3$)$_3$CSi(CH$_3$)(OCH$_3$)$_2$ as the sub-component (ii), 5.8 ml of SiCl$_4$ as an optional component and 6.0 g of triethylaluminum as the sub-component (iii) for contact at 20° C. for 2 hours. After the contact, the solid product formed was amply washed with n-heptane to form Component (A).

Copolymerization of Propylene

The procedure as set forth in Example-1 for copolymerization of propylene was followed except for the polymerization times for the steps (1) and (2) changed respectively to 2 hours and 56 minutes and 2 hours and 33 minutes. 384 g of a polymer were obtained, which had MFR of 6.3 g/10 min, bulk density of 0.41 g/cc, polymer falling speed of 6.6 sec., and rubbery copolymer content of 39.6% by weight. No polymer adhesion to the polymerization vessel was found.

Example-3

Preparation of Component (A)

As in Example-1, the Sub-components (i) was prepared and the Sub-components (i) to (iii) were caused to contact to form a solid product, to which 2.5 ml of 1,5-hexadiene were added and the reaction was conducted at 30° C. for 2 hours. The product obtained was washed with n-heptane to form Component (A).

Copolymerization of Propylene

The procedure as set forth in Example-1 for copolymerization of propylene was followed except for the polymerization times for the steps (1) and (2) changed respectively to 2 hours and 14 minutes and 3 hours and 28 minutes and 77 mg of B(OCH$_3$)$_3$ were added at the beginning of the step (2). 381 g of a polymer were obtained, which had MFR of 7.3 g/10 min, bulk density of 0.40 g/cc, polymer falling speed of 6.8 sec., and rubbery copolymer content of 55.2% by weight. No polymer adhesion to the polymerization vessel was found.

Example-4

Preparation of Component (A)

As in Example-2 the Sub-component (i) was prepared and the Sub-components (i) to (iii) were caused to contact to form Component (A), the contact of the Sub-components (i)-(iii), however, being conducted in the presence of 4.6 ml of divinylbenzene.

Copolymerization of Propylene

The procedure as set forth in Example-1 for copolymerization of propylene was followed except for the polymerization times for the steps (1) and (2) changed respectively to 1 hour and 58 minutes and 3 hours and 49 minutes and except also for the addition of 55 mg of B(OC$_2$H$_5$)$_3$ at the beginning of the step (2). 381 g of a polymer were obtained, which had MFR of 6.3 g/10 min, bulk density of 0.39 g/cc, polymer falling speed of 6.9 sec., and rubbery copolymer content of 57.9% by weight.

Comparative Example-1

Preparation of Component (A)

The procedures set forth in Example-1 were followed except for the Sub-component (i) not having undergone the ball milling.

Copolymerization of Propylene

The procedure as set forth in Example-1 for copolymerization of propylene was followed. 377 g of a polymer were obtained, which had MFR of 7.8 g/10 min, bulk density of 0.30 g/cc, and rubbery copolymer content of 34.3% by weight. No determination of polymer falling speed was possible since no falling took place.

What is claimed is:

1. A process for producing propylene block copolymer which comprises:

providing a Sub-component (i) which is obtained by subjecting a solid catalyst component to a mechanical milling treatment in a rotating ball mill, a vibration mill, a jet mill or a rod mill for a time of 10 minutes to 100 hours at a temperature of −50° to 100° C., thereby resulting in a solid catalyst component that can produce a propylene block copolymer of increased bulk density and improved falling speed, and said catalyst component is a Ziegler catalyst consisting essentially of titanium, magnesium, and a halogen atom;

providing a Sub-component (ii) which is a silicon compound represented by a formula:

$$R^1 R_{23-n}Si(OR^3)_n$$

wherein R$^1$ indicates a group selected from the group consisting of a branched hydrocarbyl group of 3 to 20 carbon atoms and an alicyclic hydrocarbyl group of 5 to 20 carbon atoms, R$^2$ which may be the same as or different from R$^1$ indicates a hydrocarbyl group of 1 to 20 carbon atoms, R$^3$ which may be the same as or different from R$^1$ and/or R$^2$ indicates a hydrocarbyl group of 1 to 4 carbon atoms; and n is a number satisfying the expression $1 \leq n \leq 3$;

providing a Sub-component (iii) which is an organoaluminum compound;

forming a Catalyst component (A) as a contact product of Sub-components (i), (ii) and (iii);

providing a Catalyst component (B) which is an organoaluminum compound;

practicing a Polymerization step (1) and a Polymerization step (2) in the substantial absence of a solvent and in the presence of a catalyst which consists essentially of Catalyst component (A) and Catalyst component (B) thereby producing a propylene block copolymer which contains a rubbery copolymer of propylene which is a fraction of the propylene block copolymer soluble in xylene at 20° C. in quantity of 10 to 70% by weight of the block copolymer;

said Polymerization step (1) being a process where propylene or a mixture of propylene with ethylene is polymerized in a single or a multiple step to form a propylene homopolymer or a propylene copolymer with ethylene of an ethylene content of no higher than 7% by weight in a quantity of 10 to 90% by weight of the total quantity of the block copolymer produced; and said Polymerization step (2) being a process wherein a mixture of propylene with ethylene is polymerized in a single or multiple step in the presence of at least a part of the process product of the Polymerization step (1) to form a rubbery copolymer of propylene with ethylene of a proportion by weight of propylene to ethylene of 90/10 to 10/90 in a quantity of 90 to 10% by weight of the total quantity of the block copolymer produced.

2. The process as claimed in claim 1, wherein Subcomponent (i) further comprises an electron donor compound introduced thereinto when it is prepared.

3. The process as claimed in claim 1, wherein Subcomponent (ii) is the silicon compound of the formula where the substituent $R^1$ is a hydrocarbyl group of 3 to 10 carbon atoms of a secondary or tertiary nature.

4. The process as claimed in claim 1, wherein Subcomponent (ii) is the silicon compound of the formula where the substituents $R^2$ and $R^3$ are each of 1 to 4 carbon atoms.

5. The process as claimed in claim 1, wherein Subcomponent (iii) is an organoaluminum compound having a hydrocarbyl substituent of 1 to 10 carbon atoms.

6. The process as claimed in claim 1, wherein Subcomponent (iii) is an alkylaluminoxane where the alkyl is a lower alkyl.

7. The process as claimed in claim 1, wherein an α-olefin is contacted with the contact product of Sub-components (i), (ii) and (iii) whereby the α-olefin is polymerized, which α-olefin is of 2 to 10 carbon atoms in a quantity after polymerization of 0.001 to 100 g per g of the contact product of Sub-components (i), (ii) and (iii).

8. The process as claimed in claim 1, wherein quantities of the polymers produced at the step (1) and the step (2) are 20 to 80% by weight and 80 to 20% by weight, respectively, of the total quantity of the block copolymer produced.

9. The process for producing propylene block copolymer as claimed in claim 1, wherein sub-component (i) is prepared by contacting a magnesium halide with a titanium tetraalkoxide and a polymeric silicon compound of the formula:

wherein $R^9$ is a hydrocarbyl group having about 1 to 10 carbon atoms and n is a degree of polymerization such that the viscosity of the polymeric silicon compound ranges from 1 to 100 centistokes, and then the contacted ingredients are further contacted with a titanium halide compound, a silicon halide compound, or combinations thereof, and then milling said contacted ingredients.

10. The process for producing propylene block copolymer as claimed in claim 1, wherein the sub-component (i) is prepared by dissolving a magnesium compound in a titanium tetraalkoxide and an electron donor, and then precipitating a solid component by adding a halogenating agent to the dissolved magnesium compound mixture, milling the solid component obtained and then contacting the milled material with a titanium compound.

* * * * *